United States Patent [19]

Mizoguchi et al.

[11] Patent Number: 5,532,080
[45] Date of Patent: Jul. 2, 1996

[54] CYLINDRICAL TYPE DRY BATTERY AND BATTERY CHAMBER

[75] Inventors: Shuri Mizoguchi; Ken Ishida; Kazuo Todo; Kiyoaki Hazama; Koujiro Yoshida, all of Hino, Japan

[73] Assignee: Konica Corporation, Japan

[21] Appl. No.: 264,723

[22] Filed: Jun. 23, 1994

[30] Foreign Application Priority Data

Jul. 2, 1993 [JP] Japan .................................. 5-164737
Oct. 14, 1993 [JP] Japan .................................. 5-257243

[51] Int. Cl.$^6$ ................................................. H01M 2/02
[52] U.S. Cl. ................... 429/164; 429/7; 429/98; 429/100; 429/121; 429/179
[58] Field of Search ................ 429/96, 98, 100, 429/164, 121, 179, 7

[56] References Cited

U.S. PATENT DOCUMENTS 5,378,549   1/1995   Eylon ........................................... 429/1
5,431,575   7/1995   Engira ...................................... 439/218

*Primary Examiner*—M. Nuzzolillo
*Attorney, Agent, or Firm*—Jordan B. Bierman; Bierman and Muserlian

[57] ABSTRACT

A dry battery includes a cylindrical housing, a first end plate and an electrode. The electrode protrudes from the first end plate and includes a tip end plate and a cylindrical side wall. The cylindrical housing, the first end plate, the tipe end plate and the cylindrical side wall each made of a conductive material are electically connected with each other so as to form a first conductive surface. A first contactor of an electrical power source circuit is arranged to come in contact with a part of the first conductive surface other than the tip end plate.

7 Claims, 6 Drawing Sheets

FIG. 7 (a)
FIG. 7 (b)
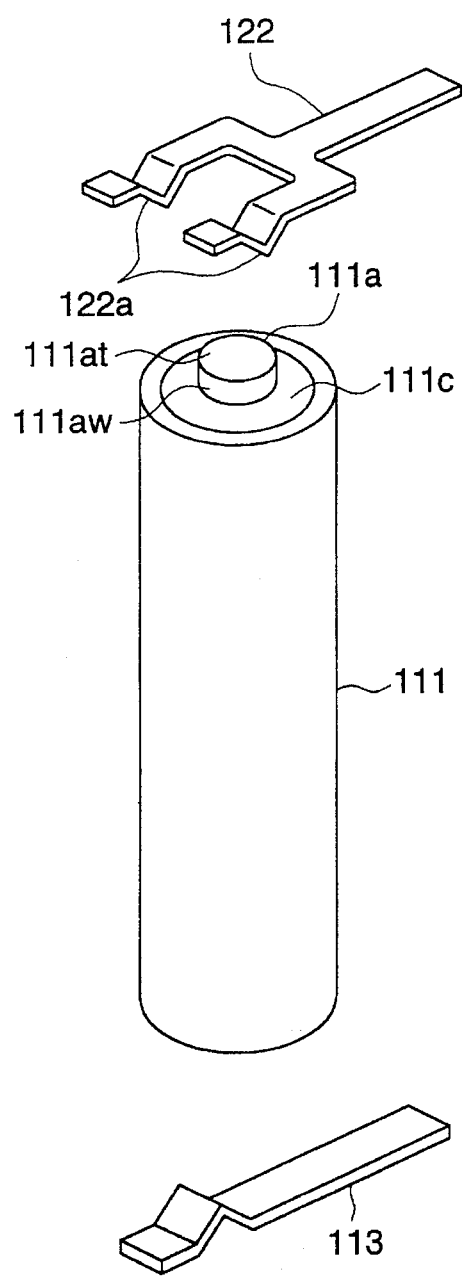
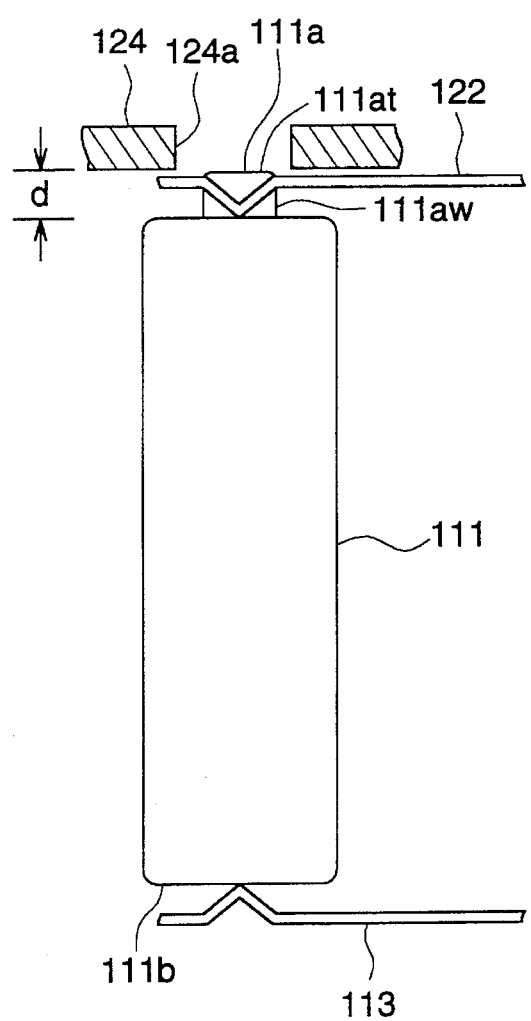

CYLINDRICAL TYPE DRY BATTERY AND BATTERY CHAMBER

BACKGROUND OF THE INVENTION

The present invention relates to a cylindrical type dry battery and a battery chamber into which the cylindrical type dry battery is assembled.

There are many apparatus, for example, electrical apparatus such as radios, head phone stereos, flash lamps and optical apparatus such as cameras, in which cylindrical dry batteries capable of supplying various amounts of electrical current depending on the necessity, and being widely sold on the market, are used. Generally, these apparatus are required to be highly portable, and accordingly, external dimensions of these apparatus are required to be highly compact. However, one component, for which a large space is necessary, is a dry battery, so that dimensions of the apparatus can not be reduced. Specifically, in an apparatus using only one cylindrical dry battery, electrode terminals of the battery are provided at both ends, so that electrode contact strips of the apparatus are provided on both ends of the battery. As widely known, at least one contact strip for the battery has spring characteristics so that dimensional deviations of the battery are absorbed and also an electrode of the battery can be contacted with the contact strip with a predetermined contact pressure. Therefore, a space for deflection of the spring action is also necessary, and further a predetermined space is necessary for connection of lead wires. Accordingly, for a battery chamber in which only one cylindrical type dry battery is intended, a predetermined space is necessary at both ends of the cylindrical type dry battery. Since there is a strong demand for down-sizing of all type of apparatus at present, the space of the battery chamber has become an increasing problem.

The first object of the present invention is to reduce the space of the foregoing battery chamber so as to allow down-sizing of various apparatus. In the present invention, not only the cylindrical type dry battery is used to which the invention described in detail as follows is applied, but also a common cylindrical type dry battery can be used.

The present invention relates to, as an application of the down-sized battery chamber, a contact strip of the battery for use in a single use camera in which simple camera functions are provided and unexposed film is factory loaded.

As is widely known, a single-use camera is a camera with factory-loaded film by which photographing can be easily enjoyed, and is mainly purchased when traveling, so that it is required that the size of the camera be reduced for portability. In order to satisfy this demand, a compact single-use camera, KONICA MINI® camera was marketed, and is now very popular.

It is now required that the camera be further reduced in size. However, since the basic functions of the camera are not changed, down-sizing of the camera has come, to some extent, to its limit. In these circumstances, the space for the battery is a relatively large component of the single-use camera. Accordingly, the second object of the present invention is to contribute to further down-sizing of the single-use camera by reducing the space of the battery chamber.

SUMMARY OF THE INVENTION

The foregoing first object is accomplished by a cylindrical type dry battery comprising: a first electrode member which has a first electrode terminal, and in which a cylindrical portion is formed by extending the first electrode terminal along the side surface; and a second electrode member having a second electrode terminal, the cylindrical portion being connected to the second electrode member through an insulating member close to the second electrode terminal, the outer periphery of the cylindrical portion being sheathed by a sheathing member, wherein a portion of the side surface of the sheath member is cut away so as to expose a portion of the cylindrical portion.

The foregoing second object is accomplished by a single-use camera of the present invention, for which a cylindrical type dry battery is used, characterized in that a contact strip for a positive electrode of the battery is provided which is contacted with a shoulder portion of the positive terminal in the cylindrical type dry battery with pressure. When the battery is provided in the vertical direction, the height of the single-use camera is reduced.

BRIEF DESCRIPTION OF THE DRAWINGS

FIGS. 7(a), and 7(b) are views of the battery chamber of the present invention.

DETAILED DESCRIPTION OF THE PREFERRED EMBODIMENT

Referring to FIG. 1 through FIG. 4, an example of the present invention will be described in detail below.

Figure 1:
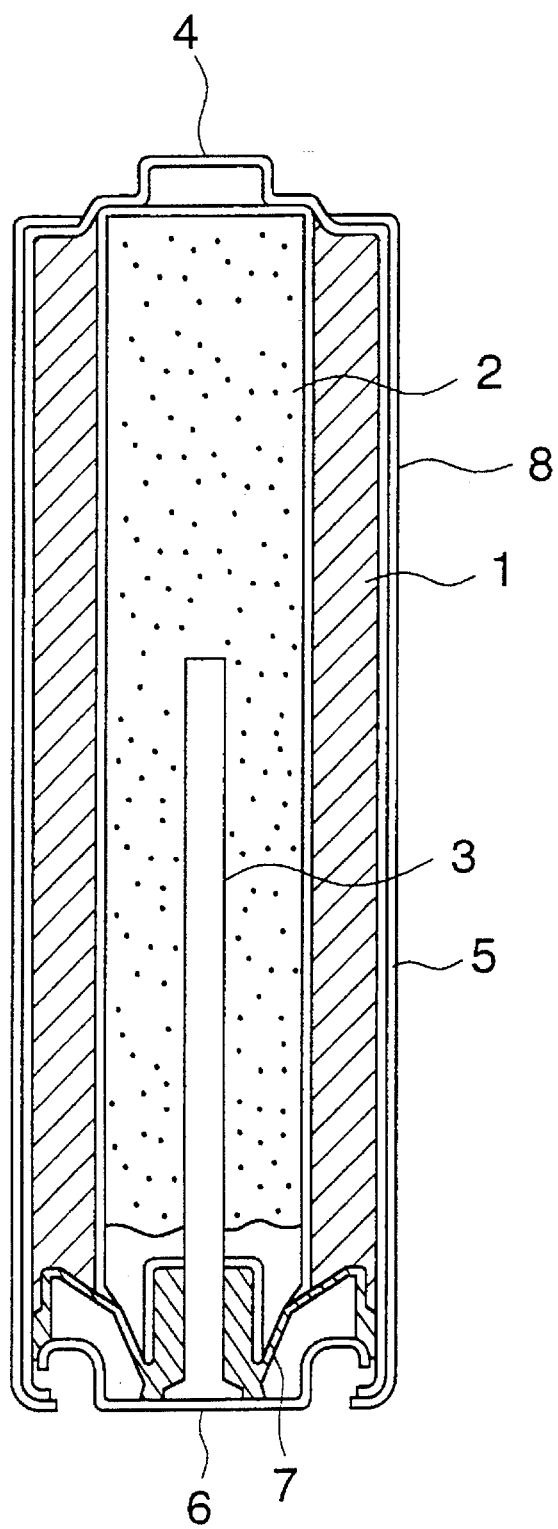
FIG. 1 is a vertical sectional view of an alkaline-manganese dry battery.

FIG. 1 shows a vertical sectional view of a common alkali-manganese battery as an example of a cylindrical type dry battery according to the present invention. Numeral 1 is a substance of a positive electrode made of manganese dioxide, numeral 2 is a substance of a negative electrode made of zinc, and a current collecting rod 3 collects electricity from the substance of the negative electrode 2. Numeral 4 is a positive electrode terminal and a member which forms the positive electrode terminal 4 is cylindrically elongated into the side surface of the battery so that a vessel 5 of the battery is formed. The vessel 5 collects current from the substance of the positive electrode 1. Numeral 6 is a negative electrode terminal which is connected to the vessel 5 through an insulating packing 7 and shields the inside of the vessel. Numeral 8 is a sheathing member made of an insulation sheet, prevents the battery from being short-circuited by the vessel 5, and is also used for labeling.

Figure 2:
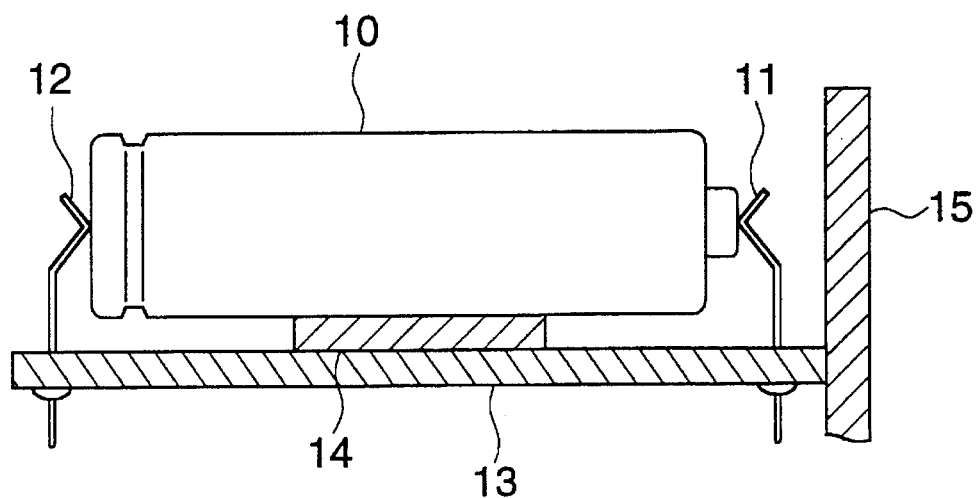
FIG. 2 is a side view of an conventional battery chamber.

FIG. 2 is a side view of a battery chamber into which a conventional cylindrical type dry battery is assembled. Numeral 10 is a cylindrical type dry battery, in which numeral 11 is a contact strip for the positive electrode, and numeral 12 is a contact strip for the negative electrode. These contact strips are respectively connected to a printed circuit board 13 and supply a predetermined amount of electric current. Numeral 14 is a holding member for the dry battery 10. Numeral 15 is a separation plate which separates the battery chamber from other mechanical areas. As described above, since the contact strips for the battery are used for both positive and negative sides with respect to the entire length of the dry battery 10 in the conventional battery chamber, a predetermined space is necessary.

Figure 3:
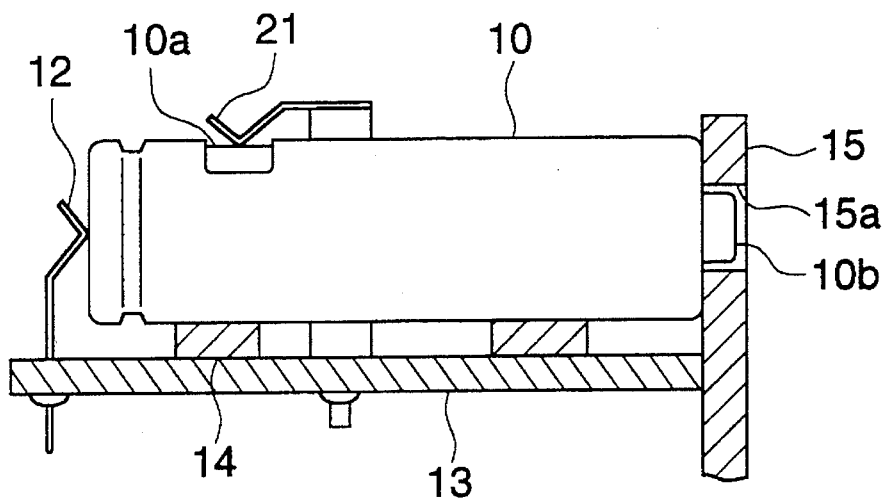
FIG. 3 is a side view of the battery chamber of the present invention.

FIG. 3 is a side view of the battery chamber into which the cylindrical type dry battery according to the present invention is assembled. Members having the same functions as those in FIG. 2 are denoted with the same numbers. The side sheathing member of the dry battery 10, which is used for the present invention, is exposed in the manufacturing process as shown by 10a so that a portion of the vessel, which continues from the positive electrode, is exposed. Numeral 21 is a contact strip for the positive electrode which is pressure-contacted onto the exposed portion of the vessel, and is connected to the printed circuit board 13. As described above, when the dry battery 10 is assembled from the direction perpendicular to the drawing, the necessary electric power can be supplied from a contact strip 21 for the positive electrode and the contact strip 12 for the negative electrode without using the original positive electrode terminal 10b, so that the space at the positive electrode terminal 10b side is eliminated. Alternatively, when a hole 15a is made in the separation plate 15, and the positive electrode terminal 10b is inserted into the hole, the space of a protrusion of the positive electrode terminal 10b can also be eliminated.

In this connection, since it is necessary that the side surface of the dry battery, which is assembled into the battery chamber in the drawing, is exposed in the manufacturing process, in order to avoid a mix-up of the two styles of batteries, it is desirable that this battery chamber is used only for apparatus such as the single-use cameras, for which battery loading by consumers is not intended.

Figure 4:
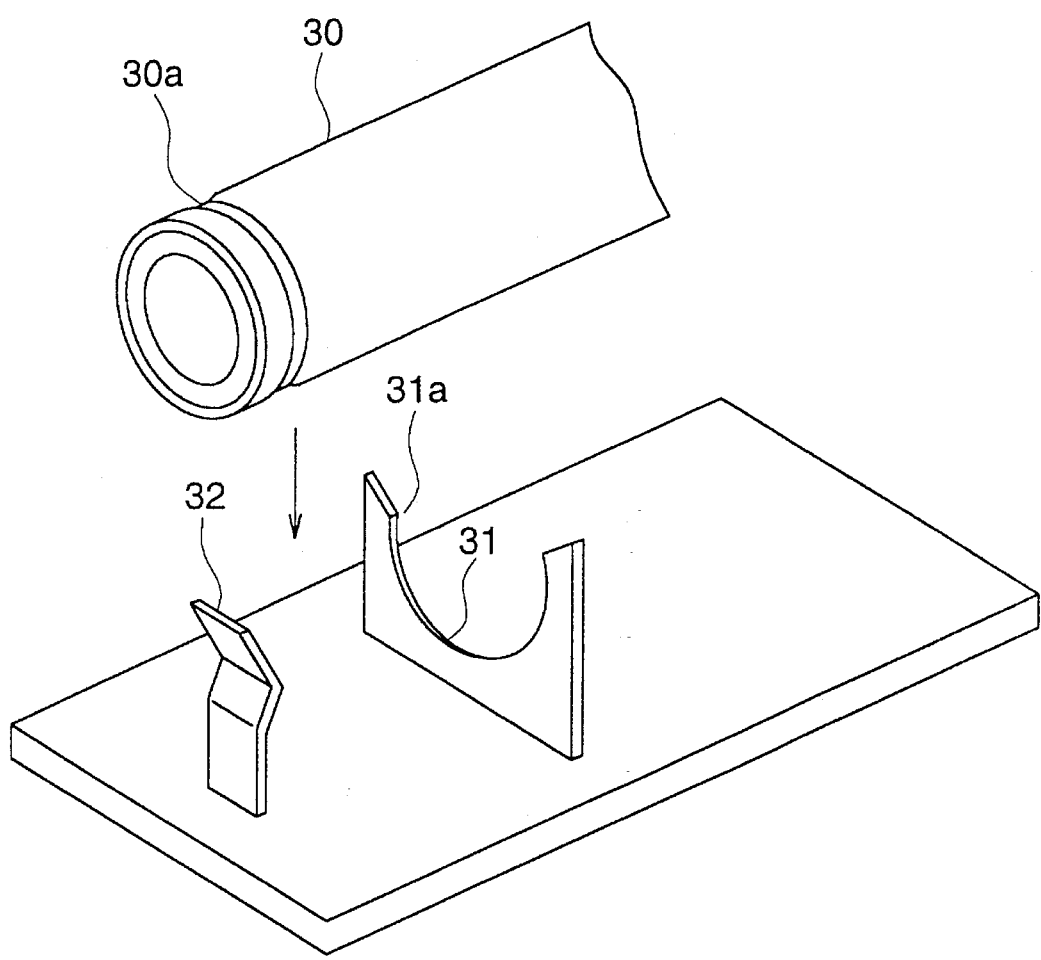
FIG. 4 is a perspective view of the battery chamber according to another example.

FIG. 4 is a perspective view of the battery chamber according to another example, in which it is not necessary to use a dry battery with a surface which is exposed in the manufacturing process. Numeral 30 is a cylindrical type dry battery, numeral 31 is a contact strip for the positive electrode, and numeral 32 is a contact strip for the negative electrode. The contact strip for the positive electrode has horn-shaped protrusions opposite to each other. The proximity of an edge 31a forms sharp knife edges, and the distance between the opposing sharp edges is structured such that the distance is slightly smaller than the outer diameter of the vessel which is provided inside the sheathing member of the dry battery 30. Accordingly, when the dry battery 30 is loaded in the arrowed direction, a portion of the sheathing member of the dry battery 30 is cut away by the sharp edge of the contact strip 31 for the positive electrode. Then, the sharp edge of the contact strip 31 for the positive electrode is directly pressure-contacted with the vessel which is connected to the positive electrode terminal provided inside the dry battery, and current from the positive electrode of the dry battery 30 flows to the contact strip 31 for the positive electrode. As described above, in this example, since it is not necessary that the side surface of the dry battery is cut away previously, a common dry battery can be used, so that the battery chamber of this example can be adapted to every apparatus.

Further, a common dry battery 30 has an indentation 30a, and when the contact strip 31 for the positive electrode is provided at a position in which the contact strip 31 is inserted into the indentation 301, disengagement of the dry battery 30 from a predetermined position, in the longitudinal direction, can be prevented.

As described above, according to the cylindrical type dry battery and the battery chamber of the present invention, when the cylindrical type dry battery, the side surface of which is factory exposed, is used, a space of the contact strip for the electrode terminal connected to the exposed portion, is not necessary. Accordingly, down-sizing of the battery chamber, that is, down-sizing of an apparatus into which the battery chamber is provided can be realized.

Further, when the contact strip of the battery cuts through the sheathing member at the time of loading of the cylindrical type dry battery, even when the cylindrical type dry battery, the surface of which has been factory exposed, is not necessarily used, a common cylindrical type dry battery can be used.

Figure 5:
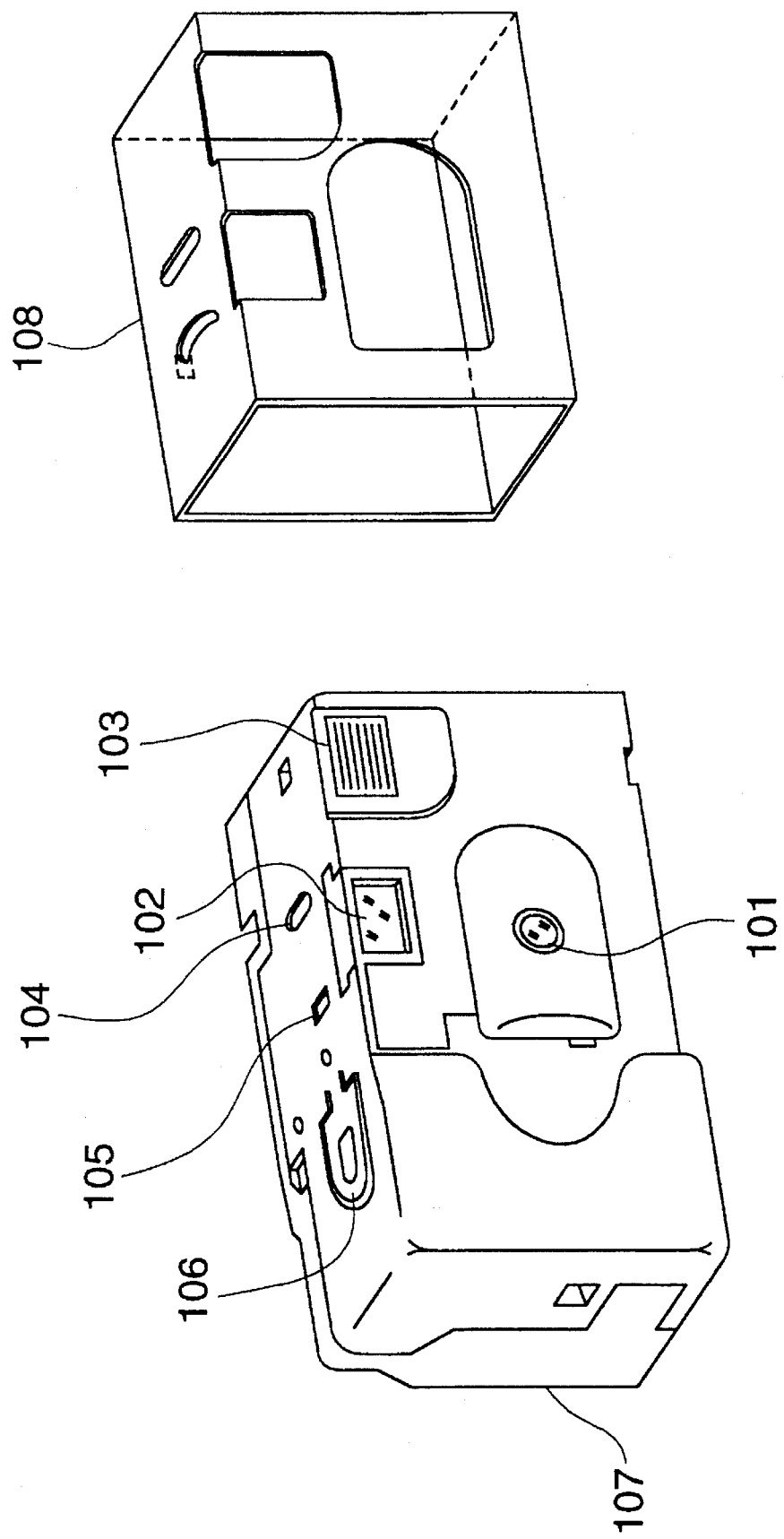
FIG. 5 is an external view of a single-use camera.

FIG. 5 is an external view of a single-use camera of the present invention, in which 135 film is factory-loaded. After exposure, the single-use camera is sent to a laboratory for development and printing under the condition that the exposed film is not re-wound, and is still housed inside the camera.

The unexposed film for the single-use camera is factory loaded into the camera under the condition that the film is housed in a cartridge. After the film has been light-shielded, a winding shaft in a film winding-chamber is driven and the entire film in the cartridge is wound into the film winding-chamber. When a camera user winds the film for each exposure, the exposed film is wound into the cartridge. Accordingly, the cartridge in which the exposed film is housed can be removed from the camera in an ordinary room in the laboratory.

Further, since the exposed film can be easily removed from the camera after a portion of a rear cover is forced, when the internal functions and the external appearance of the camera are inspected, the rear cover and any defective parts are replaced, and a new unexposed film is loaded into the camera, the single-use camera can be used again.

As a cartridge, which is loaded into the single-use camera of the present invention, the cartridge having a outer diameter of 20.6 mm is used, and it is different from a common cartridge on the market (JIS K7528). As a result, the depth of the camera can be greatly reduced except for a photographic lens, and a super thin-type compact camera can be realized.

In the drawing, numeral 101 is a photographic lens, numeral 102 is a view finder, numeral 103 is a window for a strobe light, numeral 104 is a lamp for indicating charge of a strobe unit, numeral 105 is a film counter, numeral 106 is a release button, numeral 107 is a rear cover, and numeral 108 is a cardboard carton displaying information such as trade name, simple usage, etc. on its external surface.

Figure 6:
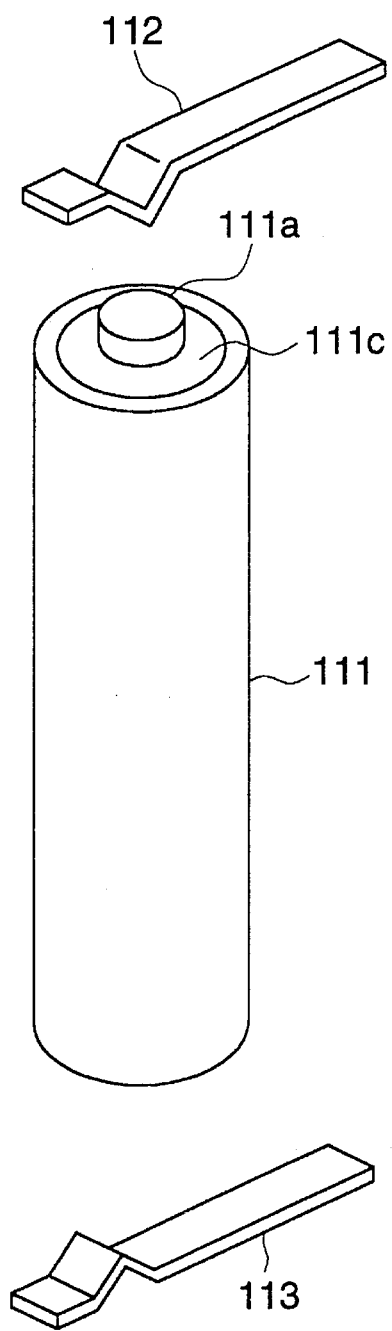
FIGS. 6(a), and 6(b) are views of a conventional battery chamber.
Figure 6:
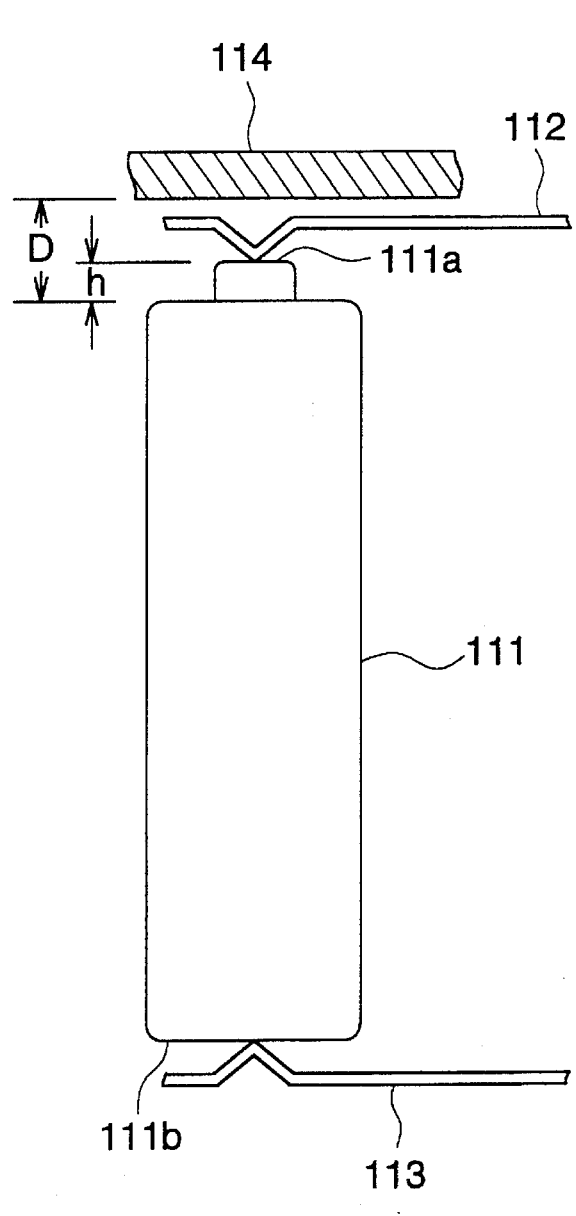

FIG. 6 is a view showing a conventional battery chamber, FIG. 6(a) is a perspective view, and FIG. 6(b) is a vertical sectional view of the battery chamber. Generally, a SUM-3 dry battery is used for the single-use camera to assure good performance. This is a component which has the largest volume, together with a capacitor of a strobe unit, as internal components. Further, since the dimension of a SUM-3 dry battery is determined by JIS, the dimension of the battery can not be freely changed in design like other mechanical parts. Accordingly, the structure and dimensions of the battery chamber for the SUM-3 type dry battery directly affect the external dimension of the single-use camera. In the drawing, numeral 111 is a dry battery, 111a is a positive electrode, and 111b is a negative electrode. Numeral 112 is a contact strip for the positive electrode, and 113 is a contact strip for the negative electrode, which are respectively pressure-contacted with the positive electrode 111a, and the negative electrode 111b of the dry battery 111. Numeral 114 is a side wall of a portion of the battery chamber.

FIG. 7 is a view showing the battery chamber of the first embodiment of the present invention, FIG. 7(a) is a perspective view of the battery chamber, and FIG. 7(b) is its vertical sectional view. Since a shoulder portion 111c of the dry battery 111 is structured of the same member as the positive electrode 111a, the polarity of the electrode is positive. Numeral 122 is a contact strip for the positive electrode, and the shoulder portion 111c of the dry battery 111 is pressure-contacted with edges 122a branched into two portions. Numeral 113 is a contact strip for the negative electrode, and pressure-contacts the negative electrode 111b in the same way as shown in FIG. 6. Numeral 124 is a side wall of a portion of the battery chamber.

When the contact strip for the positive electrode 122 is structured as described above, the length of a gap d between the shoulder portion 111c of the dry battery 111 and a side wall 124 of the battery chamber in FIG. 7, is smaller than the length of a gap D between the shoulder portion 111c of the dry battery and the side wall 114 of the battery chamber in FIG. 6 by the dimension of the height h of the positive electrode. Accordingly, the dimension of the battery chamber can be reduced by h, and the entire external dimension of the single-use camera can also be reduced by h.

Incidentally, as shown in FIGS. 7(a) and 7(b), the positive electrode 111a is composed of a tip end plate portion 111at and a cylindrical side wall portion 111aw.

The cylindrical side wall portion 111aw can be used as a contact portion to be contacted with a contact strip 122. In this case, the dimension of the battery chamber can be also reduced.

Here, the battery chamber is not adapted only to the SUM-3 type dry battery, but also can be adapted to other type batteries in which a shoulder portion and a positive electrode are structured by the same member.

Further, considering deviations of dimensions of the height h of the positive electrode, it is desirable that a hole 124a is provided in the side wall 124 of the battery chamber.

Further, both a contact strip for the positive electrode 122 and that for the negative electrode 113 may have elasticity, or one of them may have the elasticity.

As described above, according to the present invention, a space of the positive electrode side can be reduced, and accordingly, the space of the battery chamber can be reduced. As a result, since the outer dimension of a single-use camera can be reduced, a single-use camera having higher portability can be realized.

What is claimed is:

1. An electrical power source circuit for use with a dry battery, comprising:

the dry battery including
- a cylindrical housing,
- a first end plate provided at one end of the cylindrical housing,
- a first terminal provided on the first end plate so as to protrude from the first end plate, the first terminal having a cylindrical side wall and a tip end plate provided at one end of the cylindrical side wall, wherein the cylindrical housing, the first end plate, the cylindrical side wall and the tip end plate each made of a conductive material are electrically connected with each other so as to form a first conductive surface, and
- a second end plate provided at the other end of the cylindrical housing, the second end plate electrically isolated from the first conductive surface and used as a second terminal;

a first contactor arranged to come in contact with a part of the first conductive surface other than the tip end plate of the first electrode; and a second contactor arranged to come in contact with the second end plate.

2. The circuit of claim 1, wherein the dry battery further includes a sheathing member surrounding an external surface of the cylindrical housing, and wherein a part of the sheathing member is cut out and the first contactor comes in contact with the cylindrical member through the cut-out portion of the sheathing member.

3. The circuit of claim 1, wherein the first contactor includes a knife edge member to cut in a sheathing member and comes in contact with the cylindrical member through the knife edge member.

4. The circuit of claim 3, wherein the knife edge member includes a pair of knife edges opposite to each other with a gap distance therebetween, and the gap distance is smaller than a diameter of the sheathing member provided on the cylindrical housing, whereby the sheathing member is cut out when the sheathing member passes through between the knife edges.

5. The circuit of claim 1, wherein the first contactor is arranged to come in contact with the first end plate.

6. The circuit of claim 1, wherein the first terminal is a positive terminal and the second terminal is a negative terminal.

7. The circuit of claim 1, wherein the dry battery is an alkali-manganese battery.

* * * * *